(12) United States Patent
Ng

(10) Patent No.: US 7,048,374 B2
(45) Date of Patent: May 23, 2006

(54) CLIP-ON AUXILIARY LENSES UTILIZING AN ELASTIC JAW IN THE SHAPE OF HALF ARCH

(76) Inventor: Dave Ng, 11 Milford Lane, Markham, Ontario, 13R 0S1 (CA)

( * ) Notice: Subject to any disclaimer, the term of this patent is extended or adjusted under 35 U.S.C. 154(b) by 0 days.

(21) Appl. No.: 10/415,459

(22) PCT Filed: Oct. 31, 2001

(86) PCT No.: PCT/CA01/01537

§ 371 (c)(1),
(2), (4) Date: Sep. 3, 2003

(87) PCT Pub. No.: WO02/37172

PCT Pub. Date: May 10, 2002

(65) Prior Publication Data

US 2004/0051844 A1    Mar. 18, 2004

(51) Int. Cl.
*G02C 5/02* (2006.01)
*G02C 9/00* (2006.01)
(52) U.S. Cl. ............ 351/124; 351/47; 351/110
(58) Field of Classification Search .......... 351/110, 351/124, 41, 158, 47, 57, 48, 58
See application file for complete search history.

(56) References Cited

U.S. PATENT DOCUMENTS

| | | |
|---|---|---|
| 4,070,103 A | 1/1978 | Meeker |
| 4,890,910 A | 1/1990 | Gazeley |
| 4,955,707 A | 9/1990 | Gazeley |
| 4,973,148 A | 11/1990 | Gazeley |
| 5,335,025 A | 8/1994 | Wang |
| 5,416,537 A | 5/1995 | Sadler |
| 5,438,378 A | 8/1995 | Blatter |
| 5,493,348 A | 2/1996 | Herald, Jr. et al. |
| 5,568,207 A | 10/1996 | Chao |
| 5,642,177 A | 6/1997 | Nishioka |
| 5,696,571 A | 12/1997 | Spencer et al. |
| 5,737,054 A | 4/1998 | Chao |
| 5,867,244 A | 2/1999 | Martin |
| 5,880,805 A | 3/1999 | Naessens et al. |
| 5,883,689 A | 3/1999 | Chao |
| 5,889,574 A | 3/1999 | Gandl-Schiller |
| 5,907,384 A | 5/1999 | Kirsch et al. |
| 5,929,964 A | 7/1999 | Chao |
| 5,936,702 A | 8/1999 | Cheong |
| 5,975,691 A | 11/1999 | Ku |
| 6,007,197 A | 12/1999 | Locatelli |
| 6,024,445 A * | 2/2000 | Conner et al. ............ 351/110 |
| 6,053,611 A | 4/2000 | Ku |
| 6,089,708 A | 7/2000 | Ku |
| 6,109,747 A | 8/2000 | Chao |

(Continued)

FOREIGN PATENT DOCUMENTS

CA    2223295    12/1997

(Continued)

OTHER PUBLICATIONS e clips instruction card, e clips, Emeryville, California, undated, 2 pages Admitted prior art.

(Continued)

*Primary Examiner*—Hung Xuan Dang
(74) *Attorney, Agent, or Firm*—Seyfarth shaw LLP

(57) ABSTRACT

An auxiliary spectacle apparatus is provided wherein auxiliary lenses have a elastic clips configured in the shape of a half arch for releasably engaging the primary spectacles.

9 Claims, 6 Drawing Sheets

U.S. PATENT DOCUMENTS

| | | | |
|---|---|---|---|
| 6,210,002 B1 * | 4/2001 | Tachibana | 351/110 |
| 6,341,864 B1 | 1/2002 | Ng | |

FOREIGN PATENT DOCUMENTS

| | | |
|---|---|---|
| CA | 2235897 | 4/1998 |
| CA | 2236025 | 4/1998 |
| CA | 2235917 | 8/1998 |
| CA | 2235088 | 10/1998 |
| CA | 2168086 | 9/1999 |
| CA | 2180714 | 12/1999 |
| CA | 2235798 | 7/2000 |
| DE | 4316698 | 11/1994 |
| FR | 2681441 | 3/1993 |
| FR | 2768237 | 3/1999 |
| JP | 7-128620 | 5/1995 |
| TW | 78209045 | 3/1989 |
| WO | WO 90/09611 | 8/1990 |
| WO | WO 97/19384 | 5/1997 |
| WO | WO 99/47965 | 9/1999 |
| WO | WO 026718 | 5/2000 |

OTHER PUBLICATIONS

COLORClip Brochure, Regency Enterprise, Markham, ON, Canada, undated, 4 pages Admitted prior art.

* cited by examiner

CLIP-ON AUXILIARY LENSES UTILIZING AN ELASTIC JAW IN THE SHAPE OF HALF ARCH

FIELD OF THE INVENTION

The invention relates to auxiliary lenses which use clips for attachment to spectacles.

BACKGROUND OF THE INVENTION

One mechanical method of attaching auxiliary lenses is the ColorClip™ system. This system provides for holes drilled at various places around the outer perimeter of the auxiliary lenses. Soft plastic clips are then inserted into the holes. The jaw of the clip is an "S" shape. Removal and replacement of the auxiliary lenses is carried out by simultaneously (a) holding the primary frame; (b) positioning the auxiliary lens; and (c) gently bending back the "S" jaw of each clip. This is repeated for each of tie many (usually six) clips, and requires a significant degree of concentration and dexterity.

A similar system, ECLIPS, requires that the lenses be scored, coated with primer, and metal clips are then glued onto the auxiliary spectacles. The metal clips are bent such that they wrap around the primary spectacles. As repeated bending causes metal fatigue and failure, this system is not suitable for releasably securing auxiliary lenses to primary spectacles.

Another drawback of the ECLIPS and ColourClip™ systems is that each auxiliary lens must be separately attached to and removed from the primary frames. Unless the wearer goes to great lengths to accurately position each auxiliary lens, the auxiliary lens will often be positioned such that they are offset a few degrees axially in reference to the primary lens. Unless the auxiliary frames are perfectly circular, this offset makes the entire assembly, or worse, the wearer's face, appear bent or distorted.

Similarly, U.S. Pat. No. 6,007,197 to Locatelli teaches monocular auxiliary lenses having S-shaped clips for removing or replacing the auxiliary lenses. Each of the S clips on two lenses must be individually bent back in order to remove and replace the auxiliary lenses which thus can not be attached with a bridge.

Other mechanical methods for attaching auxiliary lenses are taught. U.S. Pat. No. 5,493,348 to Herald, Jr. et al. and U.S. Pat. No. 5,335,025 to Wang teach auxiliary lenses placed in thick auxiliary frames, which are configured with attachment means. These methods of attachment require thick frames that many wearers would find unsightly.

U.S. Pat. No. 5,438,378 to Blatter teaches an attachment member that is bulky and unsightly, particularly when viewed in profile.

U.S. Pat. No. 4,955,707 to Gazeley teach complex metal attachment means which are also unappealing in appearance. Also, the use of metal attachment means creates a risk that the lenses will be scratched while removing or replacing the auxiliary spectacles.

U.S. Pat. No. 5,907,384 to Kirsch et al. teaches a campanulate lens mounting strip having an arch-like bridge portion, with two hooks at the bridge, and one hook positioned near the bottom of the auxiliary frames. The utility of this apparatus is limited to reading glasses, and the auxiliary frames can only be attached to a primary frame specially configured for such attachment.

U.S. Pat. No. 5,867,244 to Martin and U.S. Pat. No. 5,696,571 to Spencer teach auxiliary spectacles which use tensioning. Complete auxiliary frames are required for these systems. If the auxiliary frame is bent significantly in any way, the method of attachment will fail. The tensioning clips are made from metal or a metal-like material. Thus, repeated bending will cause metal fatigue and failure. Also, the use of these clips requires that removal and replacement of the auxiliary spectacles be carried out at particular angles of engagement, which requires some dexterity and concentration.

U.S. Pat. Nos. 4,890,910 and 4,973,148, both to Gazeley, teach the use of a pair of rearwardly projecting flexibly resilient prongs on the auxiliary spectacles. The prongs are configured to sit in tensioning apparatus formed in the primary frame to effect a snap fit engagement. Removing and replacing the prongs requires a significant amount of force on the relatively weak bridges of the auxiliary and primary spectacles, and also requires awkward angles of engagement and disengagement. Thus this method is only useful in conjunction with thick, sturdy frames. Also, the prongs must be made of a metal or like material, thus creating a risk of damaging the primary spectacles, or worse, the wearer, when removing and replacing the auxiliary spectacles.

Thus, it would be desirable to have a simple and safe means for attaching auxiliary lenses to primary spectacles.

SUMMARY OF THE INVENTION

The present invention provides a spectacle apparatus having (a) two auxiliary lenses each having front face, a rearward face, an edge extending around the lens, and clip holes proximal to an upper edge and a lower edge of each the lens; (b) an auxiliary bridge extending between and connecting the auxiliary lenses to each other; and (c) a clip positioned at each the hole, each the clip having a base positioned against one of the faces, a clip rivet extending from the base through the hole, an arm extending from the base along the edge, and a jaw extending rearward from the arm, wherein the jaw is configured in the shape of a half arch, and the jaw is elastic.

In an embodiment of the invention, the clips are elastic. In another embodiment, the auxiliary bridge is elastic. In an embodiment, the jaw extends to a beveled end. In another embodiment, the jaw extends to a bulbous end. The lens rivets may terminate in a cap. In an embodiment, the clips are Polyflex™ plastic or memory plastic.

In one embodiment, the base is positioned against the front face of the lens and the arm extends rearward from the base against the lens edge. In another embodiment the base is positioned against the rearward face of the lens and the arm extends both forward from the base and against the lens edge, and rearward from the base to the jaw.

The invention also provides an auxiliary spectacle apparatus, comprising: (a) two auxiliary lenses; (b) a hole in each lens; (c) an auxiliary bridge extending between and connecting the auxiliary lenses to each other; (d) attachments for attaching the auxiliary lenses to a primary spectacle; and (e) lens rivets extending from the auxiliary bridge through the holes to secure the lenses to the bridge.

In one embodiment, the lens rivets extend rearward from the auxiliary bridge. In an embodiment, the auxiliary bridge is Polyflex™ plastic or memory plastic. In another embodiment, the lens rivets terminate in a bulbous end. In a further embodiment, the auxiliary spectacle apparatus has at least two holes in each lens and at least two lens rivets extending from each side of the auxiliary bridge through the holes to secure the lenses to the bridge. In an embodiment, the attachments comprises clips extending rearward from the lenses.

BRIEF DESCRIPTION OF THE DRAWINGS

A preferred embodiment of the invention will be described with reference to the accompanying drawings, in which.

DETAILED DESCRIPTION OF EMBODIMENTS

Figure 1:
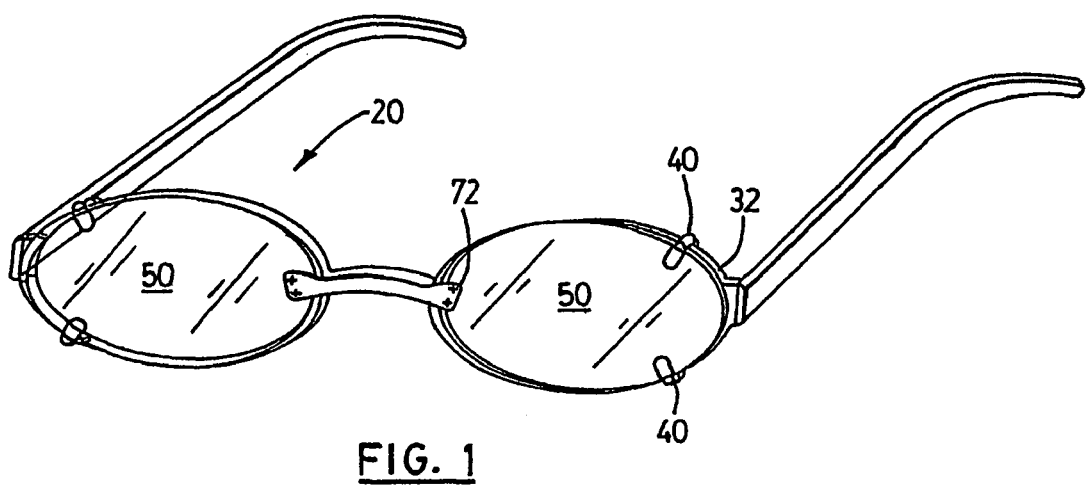
FIG. 1 is a front view of a auxiliary and primary spectacle according to the present invention

The present invention provides a simple, effective means for attaching auxiliary spectacles to primary spectacles wherein the auxiliary spectacles may be clipped onto and removed from the primary spectacles without the user having to struggle to angle the clips or open the clips in order to skirt the edge of the primary spectacles.

Preferred embodiments of the present invention will now be described in detail with reference to the appended drawings, in which like elements are denoted by like reference numerals.

As shown in FIG. 1, the auxiliary spectacles 20 of the present invention are for releasably attaching to a primary frame 32. The primary frame 32 provides retaining structure for primary lenses, which may be shaped to the wearer's visual deficiencies. Note that, in the present invention, the primary frame 32 need not encircle the lenses, but need only provide the structural support for the primary lenses.

One use for the auxiliary lenses 50 is to provide protection to the wearer from sunlight and other vision-damaging elements. Therefore, the auxiliary lenses 50 may be tinted, and may also include a material therein or a coating thereon to filter ultraviolet light or other specific wavelengths of light.

The auxiliary spectacles 20 have two auxiliary lenses 50, and an auxiliary bridge 60 extending between and connecting the auxiliary lenses. As is seen in FIG. 3, FIG. 4, FIG. 2A and FIG. 2B, auxiliary bridge 60 provides a retaining means for auxiliary lenses 50, comprising lens rivets 72 which terminate in bulb 74. When assembled, lens rivets 72 extend horizontally for insertion through bridge rivet hole 52 in lenses 50. Bulb 74 provides security of attachment of lenses 50 to auxiliary bridge 60. Bulb 74 may be present during assembly of lenses 50 to auxiliary bridge 60, or it may be formed or partially deformed upon assembly, to increase the security of attachment.

Upon assembly of auxiliary bridge 60 and auxiliary lenses 50, lens rivet 72 will be inserted through a bridge rivet hole 52 in each lens. In the embodiment shown, two lens rivets extend through two bridge rivet holes 52 for each lens. This provides security of fit and prevents vertical rotation of the lens in relation to the bridge.

By use of Polyflex™ or memory plastic, the insertion of the lens rivets 72 may be carried out without risk of damage to the lenses 50. Bulb 74 is configured such that it is greater in diameter than hole 52 when not deformed. The use of such materials also allows for the insertion of bulb 74 through a hole in the lense, by temporary deformation of bulb 74. Upon being inserted through the hole, bulb 74 reestablishes, by plastic memory, its original diameter, thus securing lens 50 to auxiliary bridge 60, in an interference fit. The security of attachment may be increased by treating bulb 74 with a glue or other fixative after assembly, or by treating bulb 74 to compression forces which are great enough to permanently deform bulb 74, spreading it against the rear surface or lens 50 immediately around bridge rivet hole 52.

Figure 2A:
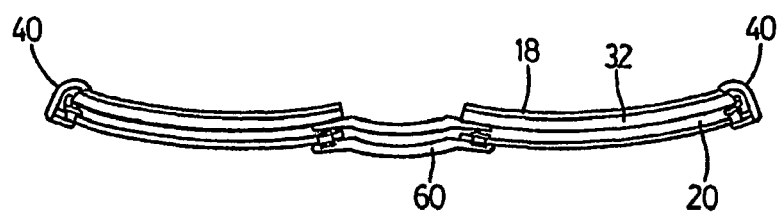
FIG. 2A is a top view of an auxiliary and primary spectacle according to the present invention.
Figure 2B:
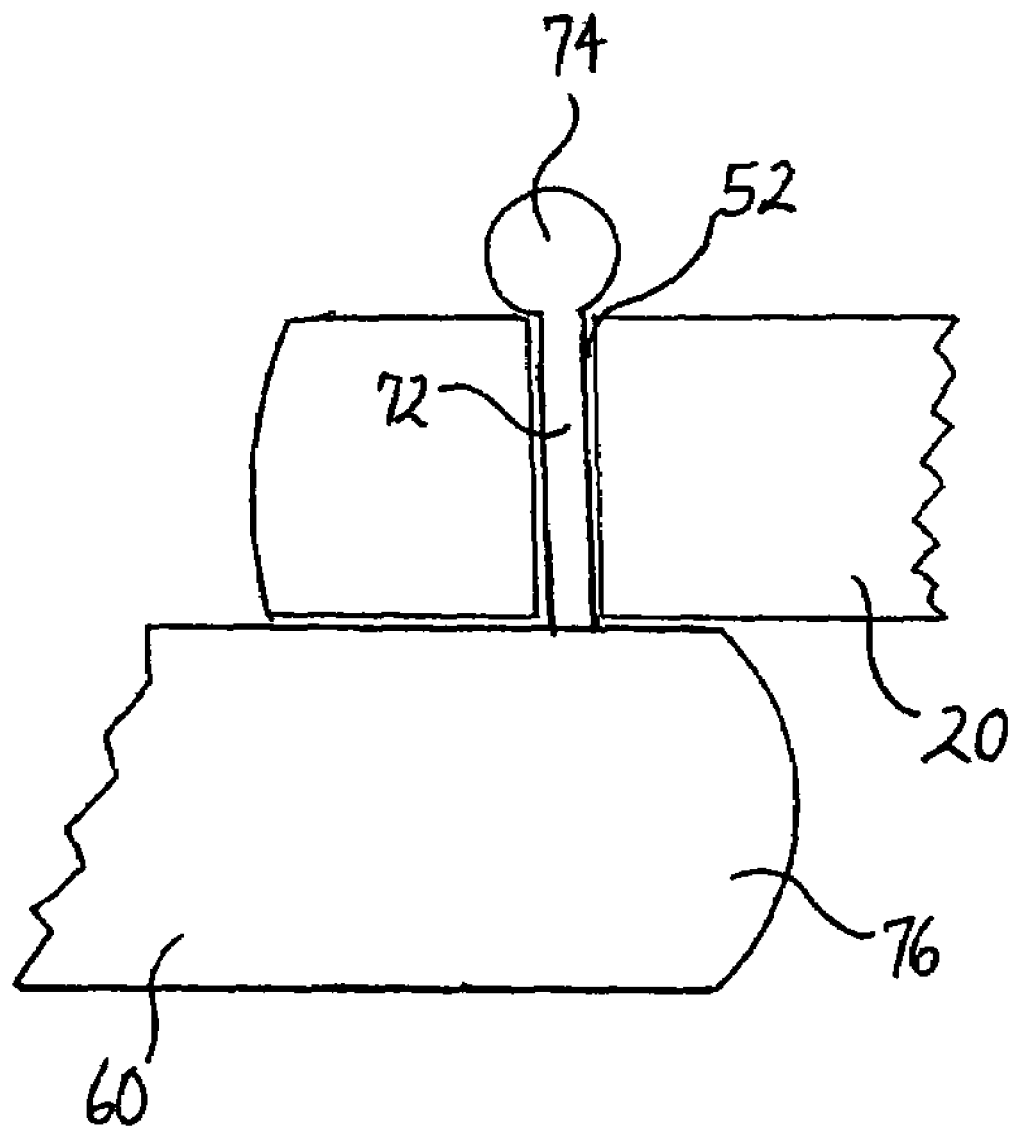
FIG. 2B is a cross-section view of an auxiliary and primary spectacle according to the present invention.
Figure 3:
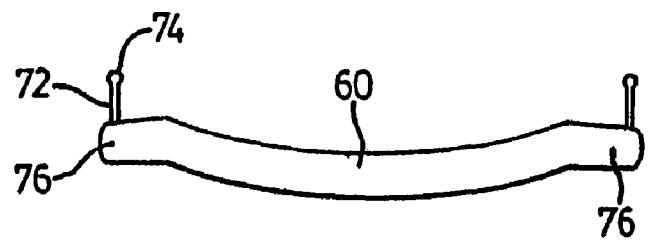
FIG. 3 is a top view of an auxiliary bridge according to the present invention.
Figure 4:
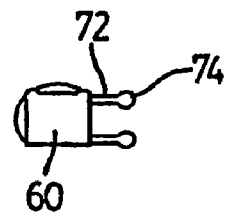
FIG. 4 is a side view of an auxiliary bridge according to the present invention.
Figure 7:
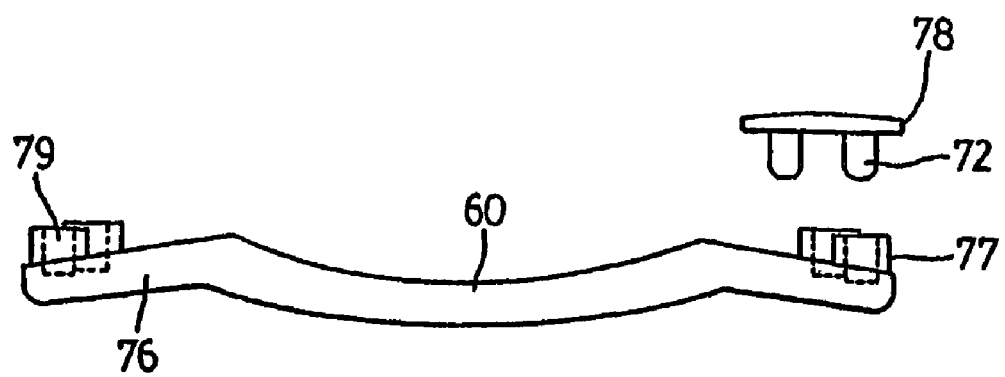
FIG. 7 is a top view of an auxiliary bridge (disassembled) according to the present invention.
Figure 8:
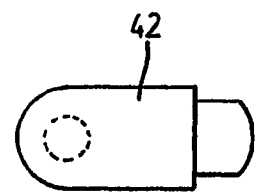
FIG. 8 is a front view of an clip according to the present invention.
Figure 9:
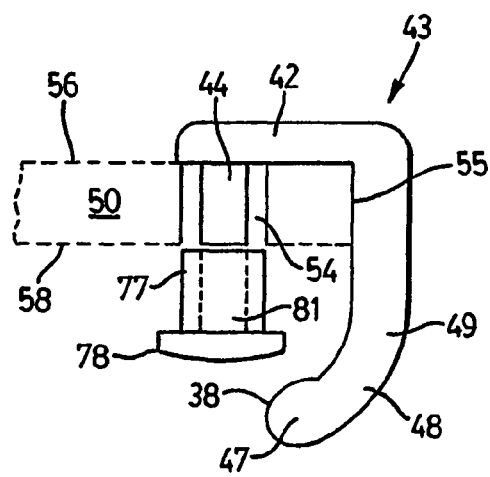
FIG. 9 is a top view of a clip (disassembled) according to the present invention.

In another embodiment, seen in FIG. 2B and FIG. 7, upon assembly of auxiliary bridge 60 and auxiliary lenses 50, lens rivet 72 is inserted through a hole 52 in each lens. Cap 78 of FIG. 7 is configured such that lens rivets 72 of the cap are received in corresponding orifices extending lengthwise in receptors 77. Upon being inserted into the orifices, receptors 77 secure cap 78 to auxiliary bridge 60, in an interference fit, thus securing auxiliary lenses 50 to auxiliary bridge 60, as best seen in FIG. 9 and FIG. 4. The security of attachment may be increased by treating lens rivets 72 with a glue, cement, or other fixative during assembly, or by treating cap 78 to compression forces which are great enough to permanently, slightly, deform lens rivets 72, spreading them outwards within the orifices of receptors 77.

The auxiliary bridge 60 thus provides a lightweight means for attaching auxiliary lenses to each other, without requiring complete frames for the auxiliary lenses. This provides a savings in cost as well as weight, and permits for an more esthetic appearance for the auxiliary lenses.

The auxiliary spectacle 20, when assembled, is a one-piece unit. The auxiliary lenses 50 are configured to cover both of the primary lenses 18. The external shape of the auxiliary lenses 50 will generally correspond with the external shape of the primary lenses 18.

Figure 5:
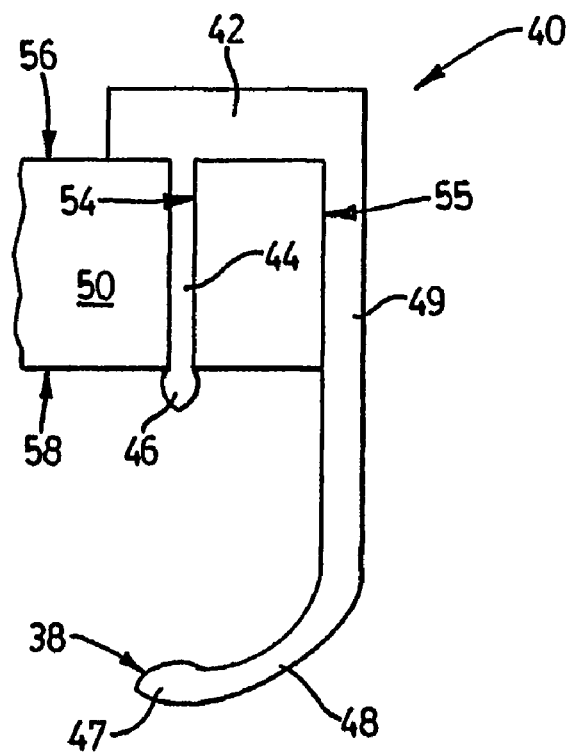
FIG. 5 is a cross-section side view of a first embodiment of a clip according to the present invention.
Figure 6:
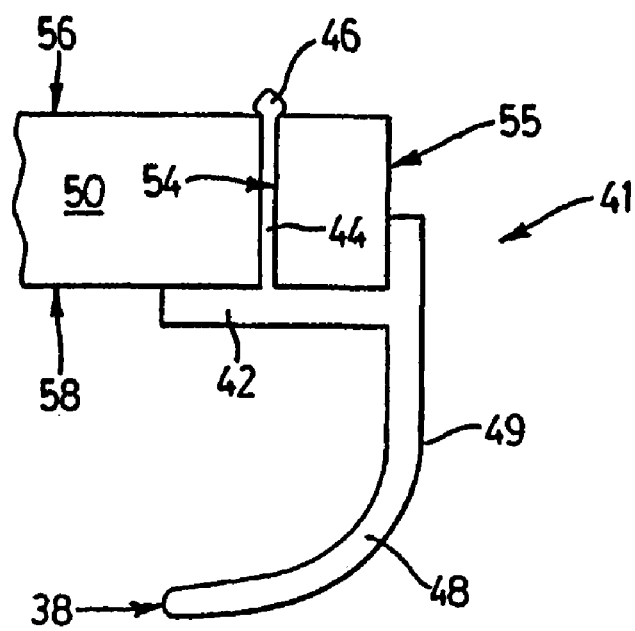
FIG. 6 is a cross-section side view of a second embodiment of a clip according to the present invention.

As seen in FIG. 1, auxiliary spectacles 20 include clips 40, which are positioned near the top and near the bottom of each of lens 50. In other embodiment, discussed in more detail below, clips 40 may be replaced with clips 41 of FIG. 6. As seen in FIG. 2A, FIG. 5 and FIG. 6, clips 40 or 41 wrap around the edge 55 of lens 50, and extend rearward from lens 50. As shown in FIG. 2A, FIG 5, FIG. 6 and FIG. 8, these clips are preferably beveled.

FIG. 5 shows a cross-section side view of a first embodiment of a clip 40 of the present invention. Clip 40 includes a base 42 which is positioned against the front face 56 of auxiliary lens 50. An arm 49 extends rearwardly from base 42. Arm 49 is positioned against the edge 55 of lens 50. Arm 49 continues rearward past edge 55, where arm 49 forms a jaw 48, which curves in an elbow or half arch shape medially (i.e. towards the bridge 60). In the embodiment shown in FIG. 5, jaw 48 terminates in a bulbous end 47. Clip rivet 44 extends rearwards from base 42, through a clip hole 54 in lens 50. After extending through hole 54, clip rivet 44 terminates in a bulbous end 46, which provides security of attachment of clip 40 to lens 50. The primary lenses are not shown, in order to better show the detail of clip 40.

FIG. 6 shows a cross-section side view of a second embodiment of a clip 41 of the present invention. Clip 41 includes a base 42 which is positioned against the rearward face 58 of auxiliary lens 50. Arm 49 extends forward and is positioned against the edge 55 of lens 50. Arm 49 also extends rearwardly from base 42, and leads to jaw 48, which curves in an elbow or half arch shape medially (i.e. towards the bridge 60). In one embodiment (not shown), jaw 48 terminates in a bulbous end. Clip rivet 44 extends forward from base 42, through a clip hole 54 in lens 50. After extending through hole 54, clip rivet 44 terminates in a bulbous end 46, which provides security of attachment of clip 41 to lens 50. The primary lenses are not shown, in order to better show the detail of clip 41.

FIG. 9 shows a side view of another embodiment of a clip 43 of the present invention. Upon assembly of clip 43 and auxiliary lenses 50, lens rivet 44 is inserted through a hole 54 in each lens. Cap 78 is configured such that lens rivet 44 of the cap is received in corresponding orifice 81 extending lengthwise in receptors 77. Upon being inserted into orifice 81, receptor 77 secures cap 78 to clip 43, in an interference fit, thus securing auxiliary lense 50 to clip 43, as best seen in FIG. 2. The security of attachment may be increased by treating lens rivets 44 with a glue, cement, or other fixative during assembly, or by treating cap 78 to compression forces which are great enough to permanently, slightly, deform lens rivets 44, spreading them outwards within the orifices of receptors 77.

Figure 10:
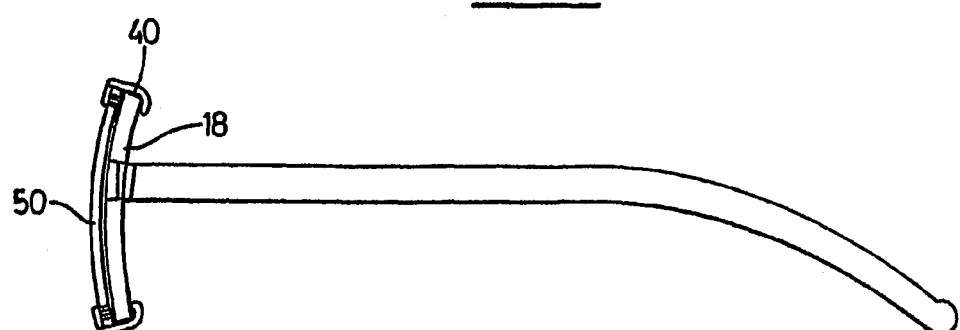
FIG. 10 is a side view of a auxiliary and primary spectacle according to the present inventior.

In use, auxiliary spectacles 20 are pushed onto the face of primary spectacles. When jaw 48 encounters the face of the primary spectacles, it deforms, bending towards the auxiliary lens 50. Simultaneously, arm 49 is deformed by the movement of jaw 48. Due to the curvature of jaw 48 at the point of contact between clip 40 and the primary spectacles, arm 49 deforms laterally (i.e. outwards, away from lens 50). This deformation of arm 49 carries jaw 48 laterally, causing it to flank or skirt the outer edge of the primary spectacles. When auxiliary spectacles 20 have been pushed close enough to the primary spectacles, jaw 48 reforms, by plastic memory, its original shape, causing jaw 48 to become positioned on the rearward face of the primary spectacles. Thus, the primary spectacles have become engaged between jaw 48 and auxiliary spectacles 20. This occurs more or less simultaneously at each of the clips, so that collectively the clips secure the auxiliary spectacles to the primary spectacles, as shown in FIG. 1, FIG. 2A and FIG. 10.

Other angles of curvature for jaw 48 may be suitable, so long as the curvature and length of jaw 48 is small enough that auxiliary spectacles 20 may be clipped onto and removed from the primary spectacles without the user having to struggle to push back jaw 48 to allow jaw 48 to skirt the edge of the primary spectacles.

In the use of clip 40, arm 48's lateral interference fit with edge 55 of lens 50 enhances security of attachment for movement along the plane of the lenses, while base 42's lateral interference fit with a front face 56 enhances security of attachment for movement perpendicular to the plane of the lenses.

In the use of clip 41, arm 48's lateral interference fit with edge 55 of lens 50 enhances security of attachment for movement along the plane of the lenses, while base 42's lateral interference fit with a rearward face 58 enhances security of attachment for movement perpendicular to the plane of the lenses.

When assembled, clips 40 or 41 form a tight fit with primary spectacles which prevents movement of the auxiliary bridge off the primary spectacles. The mechanical clamping of the clip system of the present invention provides an exceptional security of fit for both horizontal movement and vertical movement. This tight fit prevents rotation of the bridge off its vertical axis and horizontal axes, which could cause rattling when the assembled apparatus of the invention is being used by a wearer during vigorous activity. The risk of accidental detachment of the auxiliary spectacles is also greatly reduced. A bump or collision which dislodges other, known apparatus will not give rise to the auxiliary spectacles detaching from the primary spectacles, because of the interference fit described herein.

Clips 40 or 41 are made of any material with a plastic memory. In embodiments of the invention, clips 40 or 41 ares made with Polyflex (Hyundai Optical Co., Inchon City, Korea) or memory plastic. Memory plastic and Polyflex™ are lightweight plastics that can be bent or stretched without losing their original shape. Polyflex™ is particularly resilient in this regard. By use of such materials, the clips may be used repeatedly without any deformation of shape of the hooks and the bridge, and without any degradation of security of attachment. Also, the use of such materials decreases the chance that the user may be scratched or injured by the edges of clips 40 or 41. Such materials are also particularly suitable for the auxiliary bridge 60.

The ends 38 of clips 40 or 41 are preferably beveled to facilitate the jaws 48 skirting the primary spectacles while removing or replacing the auxiliary spectacles, and to decrease the probability of scratching oneself with the ends 38 of the clips.

When the fastening apparatus of the invention is engaged, auxiliary lenses 50 are located proximal to primary lenses 18, so that a minimum amount of light may enter the between the respective lenses.

Because clips 40 or 41 and lens rivets 44 project outwardly, no recesses are required in the auxiliary bridge, which would weaken it. Furthermore, by avoiding the use of recesses in the fastening apparatus, one is provided with an auxiliary spectacle which can be easily removed and replaced on the primary spectacles, without any flexing or bending of the frames or bridges and without engaging auxiliary spectacles 20 at difficult angles in relation to the primary spectacles.

It will thus be appreciated that the present invention provides a secure method of attaching auxiliary spectacles to primary spectacles without sacrificing the ease with which one can remove and replace the auxiliary spectacles. Removal and replacement can be done with one hand, and without awkward angles of engagement and disengagement.

The use of the present invention, as opposed to a other known means, provides significant benefits. First, in producing the apparatus, the auxiliary bridge may be cast from a desired material, and is then ready for assembly. No drilling or puncturing is required to produce holes, for example, for insertion of magnets. No magnets or other additional pieces are required, and no fixative is required to install the means for securing attachment. As the apparatus for securing attachment of the present invention is a "unibody" design, the apparatus will not become loose or fall out with the passage of time and the weathering effect of changes in temperature and humidity. The auxiliary bridge may be made from Polyflex™. Memory plastic and Polyflex™ are lightweight plastics that can be bent or stretched without losing their original shape. Polyflex™ is particularly resilient in this regard.

Another benefit of the present means for attachment is that the auxiliary apparatus can be used with existing primary spectacles. No special adaptation of the primary spectacles is required. Auxiliary lenses may be configured in the desired shape, and the bridge and clips of the present invention may be added to produce auxiliary spectacles suitable for any existing primary spectacles.

Another benefit of the present means of attaching the auxiliary bridge to the auxiliary lenses is that no lens frames are required for the auxiliary lenses, thus decreasing the weight of the auxiliary spectacles and decreasing the cost of producing the auxiliary spectacles.

The above-detailed description with reference to the illustrations is considered to be illustrative and not restrictive in character. Modifications and variations on the embodiments described may be made within the scope of the invention. For example, the auxiliary lenses 50 may also be used for magnification of vision. In this case, the auxiliary lenses 50 would be fashioned in the same manner as a magnifying glass and fit onto the primary lenses 18, which may or may not be prescription lenses. The auxiliary lenses 50 would then enlarge small or intricate details to make them more readily observable, so as to reduce the strain on the eyesight of the wearer. The auxiliary lenses 50 may also have decorations thereon to be viewed by observers of the wearer, to enhance the appearance of the lenses or for amusement purposes.

In another embodiment, the present invention also contemplates primary spectacles 42 which contain no primary lens 18. This embodiment would be useful in the circumstances wherein the user desires to remove and replace the auxiliary spectacles 20, but does not require the primary lenses 18 for assisting vision. For example, this embodiment would be useful in the context of welding, wherein very dark lenses are required during the welding, but between welding, it may be desirable to have no lenses on. As another example, where an individual suffers from a visual defect which makes reading difficult, it may be desirable to have no lenses except when reading.

In the embodiment shown, the two clips 40 or 41 on each lens 50 prevent horizontal movement of the assembled apparatus. However, in other embodiments (not shown) horizontal movement could be prevented by supplying more than two of each of clips 40 or 41 to each lens 50.

The present invention thus teaches a design which is functionally and structurally different and which is an improvement in various functional ways.

For example, connecting auxiliary lens with a bridge enhances the security of attachment of the lens. Each individual lens has, in essence, an additional point of attachment in the attachment with the bridge, which is secured by means of the attachments on the opposite lens.

Figure 11:
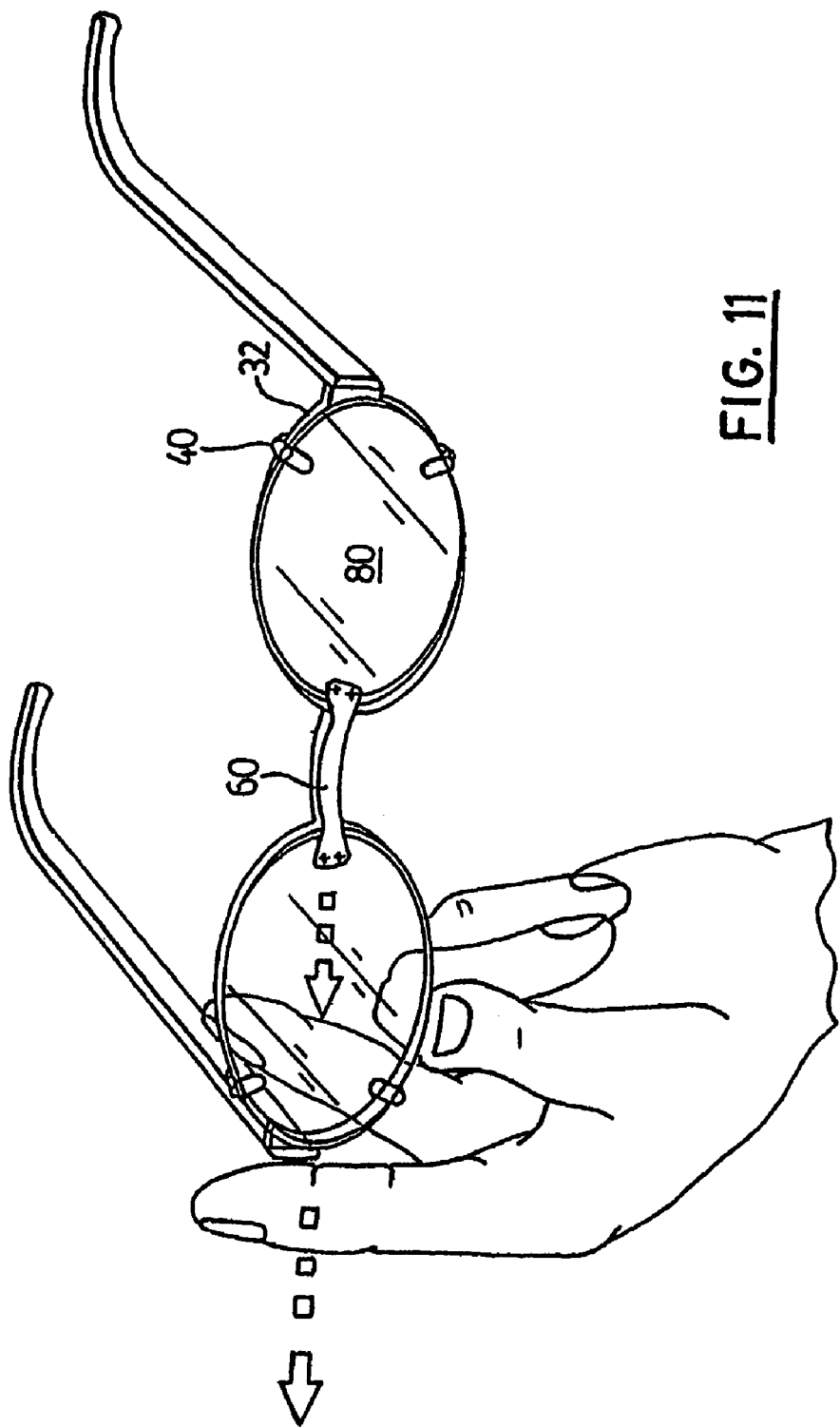
FIG. 11 is a front view of a auxiliary and primary spectacle according to the present invention, in use.

Secondly, connecting the auxiliary lens with a bridge facilitates removal and replacement of the auxiliary lens. This is an important feature which is enhanced due to the unique features of the jaw used for clipping the lens on. As described above, the jaw is configured in the shape of a half-arch and is elastic. As shown in FIG. 11, by use of this configuration of the jaw, the auxiliary lens can be readily and easily removed and replaced by:
(a) moving the auxiliary lens assembly in one direction, for example laterally to the left, thus releasing the hooks on the left side of the assembly;
(b) lifting the left hand side of the auxiliary lens assembly away from the primary lenses; and
(c) moving the auxiliary lens assembly laterally to the right, thus releasing the hooks on the right hand side of the assembly.

Replacing the auxiliary lenses may be easily accomplished by performing the opposite movements.

Thus, connecting the auxiliary lens with a bridge facilitates the removal and replacement of the auxiliary lens, in that the act of removing and replacing can be done with a series of very simple movements. This is in contrast with the prior art.

Furthermore, by connecting the auxiliary lens with a bridge, the proper orientation of the auxiliary lenses on the primary lenses is facilitated. One can not accidentally attach the lenses upside down or even a few degrees off center.

The present invention creates auxiliary lenses which are easier to remove and replace, without having to individually fold back each bend or curve. As described, moving the auxiliary lens laterally to the left disengages the half-arched jaws on the left hand side of the lens. This movement is allowed by the elastic nature of the jaws, as the jaws on the right hand side are then bent outwards. Once the jaws on the left hand side are released, the left hand side of the auxiliary lens is moved outwardly from the primary lens. A slight rightward movement then releases the jaws on the right hand side of the lens. Thus through this innovative structure one is able to simultaneously and easily remove or replace a pair of auxiliary lenses.

It is to be understood that only the preferred embodiments have been shown, and that modifications thereof would be readily apparent to one skilled in the art. Therefore, the true scope and spirit of the invention resides in the appended claims and their legal equivalents, rather than by the given examples.

The invention claimed is:

1. A spectacle apparatus comprising:
   (a) two lenses each having a rivet hole;
   (b) a bridge having:
      (i) lateral ends;
      (ii) lens rivets extending horizontally from said lateral ends;
   wherein said lens rivets have a distal end of said lens rivet spread against said lenses.

2. A spectacle apparatus as claimed in claim 1, wherein said lens rivets extend rearward from said bridge.

3. A spectacle apparatus as claimed in claim 1, wherein said bridge is a bridge for auxiliary spectacles.

4. A spectacle apparatus as claimed in claim 1, wherein said lens rivet is secured to the lens using an adhesive.

5. A spectacle apparatus, comprising:
   (a) two lenses;
   (b) a hole in each lens;
   (c) a bridge extending between and connecting said lenses to each other;
   (d) lens rivets extending rearward from said bridge through said holes to secure said lenses to said bridge, wherein said lens rivets terminate in a bulbous end.

6. A spectacle apparatus as claimed in claim 5, wherein said rivets are Polyflex™ plastic or memory plastic.

7. A spectacle apparatus as claimed in claim 5, having at least two holes in each lens and at least two lens rivets extending from each side of said bridge through said holes to secure said lenses to said bridge.

8. A spectacle apparatus as claimed in claim 5, wherein said lens rivets terminate in a cap.

9. A spectacle apparatus as claimed in claim 5, wherein said lens rivet is secured to the lens using an adhesive.

* * * * *